(12) United States Patent
Despres et al.

(10) Patent No.: US 12,296,298 B2
(45) Date of Patent: May 13, 2025

(54) DOUBLE-LAYER THREE-WAY CATALYST WITH FURTHER IMPROVED AGEING STABILITY

(71) Applicant: UMICORE AG & CO. KG, Hanau-Wolfgang (DE)

(72) Inventors: Joel Despres, Rodenbach (DE); Martin Roesch, Rodgau (DE); Joerg-Michael Richter, Frankfurt (DE); Carolin Braun, Langen (DE); Marcus Schmidt, Ginsheim (DE); Nicole Schichtel, Butzbach Hoch-Weisel (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 339 days.

(21) Appl. No.: 17/758,826

(22) PCT Filed: Jan. 26, 2021

(86) PCT No.: PCT/EP2021/051728
§ 371 (c)(1),
(2) Date: Jul. 14, 2022

(87) PCT Pub. No.: WO2021/151876
PCT Pub. Date: Aug. 5, 2021

(65) Prior Publication Data
US 2023/0045409 A1 Feb. 9, 2023

(30) Foreign Application Priority Data

Jan. 27, 2020 (DE) .................. 102020101876.2

(51) Int. Cl.
| | |
|---|---|
| *B01J 21/04* | (2006.01) |
| *B01D 53/94* | (2006.01) |
| *B01J 21/06* | (2006.01) |
| *B01J 23/10* | (2006.01) |
| *B01J 23/42* | (2006.01) |
| *B01J 23/44* | (2006.01) |
| *B01J 23/46* | (2006.01) |
| *B01J 23/63* | (2006.01) |
| *B01J 35/00* | (2006.01) |
| *B01J 35/10* | (2006.01) |
| *F01N 3/10* | (2006.01) |
| *F01N 3/28* | (2006.01) |

(52) U.S. Cl.
CPC ............ *B01D 53/945* (2013.01); *B01J 23/10* (2013.01); *B01J 23/44* (2013.01); *B01J 23/464* (2013.01); *B01J 35/19* (2024.01); *F01N 3/101* (2013.01); *F01N 3/2803* (2013.01); *B01D 2255/1021* (2013.01); *B01D 2255/1023* (2013.01); *B01D 2255/1025* (2013.01); *B01D 2255/2061* (2013.01); *B01D 2255/2063* (2013.01); *B01D 2255/2065* (2013.01); *B01D 2255/20715* (2013.01); *B01D 2255/2092* (2013.01); *B01D 2255/407* (2013.01); *B01D 2255/9022* (2013.01); *B01D 2255/908* (2013.01); *F01N 2370/02* (2013.01)

(58) Field of Classification Search
CPC . B01J 21/04; B01J 21/066; B01J 23/10; B01J 23/42; B01J 23/44; B01J 23/464; B01J 23/63; B01J 35/19; F01N 3/101; F01N 3/2803; B01D 53/945
USPC ........ 502/302–304, 332–334, 339, 349, 355, 502/415
See application file for complete search history.

(56) References Cited

U.S. PATENT DOCUMENTS

| | | | |
|---|---|---|---|
| 8,663,588 B2 | 3/2014 | Lindner et al. | |
| 8,808,653 B2 | 8/2014 | Mikita et al. | |
| 9,517,448 B2* | 12/2016 | Kearl | B01J 23/464 |
| 9,517,462 B2 | 12/2016 | Roesch et al. | |
| 10,337,372 B2* | 7/2019 | Nobukawa | F01N 3/2066 |
| 10,413,886 B2 | 9/2019 | Despres et al. | |
| 2001/0031699 A1* | 10/2001 | Matsumoto | B01D 53/945 423/213.7 |
| 2006/0217263 A1* | 9/2006 | Kawamoto | B01J 35/19 502/325 |
| 2008/0042104 A1* | 2/2008 | Chen | B01J 23/58 252/372 |
| 2008/0044329 A1* | 2/2008 | Chen | F01N 13/0097 423/213.2 |
| 2010/0124523 A1 | 5/2010 | Chen et al. | |

(Continued)

FOREIGN PATENT DOCUMENTS

| | | |
|---|---|---|
| CN | 110 665 501 A | 1/2020 |
| EP | 0 885 650 A2 | 12/1998 |
| EP | 1 046 423 A2 | 10/2000 |

(Continued)

OTHER PUBLICATIONS

International Search Report dated May 3, 2021 for International Patent Application No. PCT/EP2021/051728 (4 pages in German with English Translation).

(Continued)

*Primary Examiner* — Cam N. Nguyen
(74) *Attorney, Agent, or Firm* — Smith, Gambrell & Russell, LLP

(57) ABSTRACT

The present invention relates to a catalyst comprising two layers on an inert catalyst carrier, a layer A containing at least palladium as a platinum group metal, in addition to a cerium/zirconium/lanthanum/yttrium mixed oxide, and a layer B, which is applied to layer A, containing at least rhodium as the platinum group metal, in addition to a cerium/zirconium/lanthanum/yttrium mixed oxide.

11 Claims, No Drawings

(56) References Cited

U.S. PATENT DOCUMENTS

2017/0189892 A1 7/2017 Yin et al.
2017/0368536 A1 12/2017 Despres et al.

FOREIGN PATENT DOCUMENTS

| EP | 1 726 359 A1 | 11/2006 |
|---|---|---|
| EP | 1 974 809 B1 | 9/2010 |
| EP | 1 900 416 B1 | 4/2011 |
| EP | 1 541 220 B1 | 2/2014 |
| EP | 3 045 226 A1 | 7/2016 |
| JP | 2005-224792 A | 8/2005 |
| JP | 2015-037784 A | 2/2015 |
| JP | 2019-013895 A | 1/2019 |
| WO | 95/35152 A1 | 12/1995 |
| WO | 2008/000449 A2 | 1/2008 |
| WO | 2009/012348 A1 | 1/2009 |
| WO | 2018/069199 A1 | 4/2018 |

OTHER PUBLICATIONS

Written Opinion of the International Searching Authority dated Feb. 15, 2021 for International Patent Application No. PCT/EP2021/051728 (5 pages).
Translation of the Written Opinion of the International Searching Authority mailed May 3, 2021 for International Patent Application No. PCT/EP2021/051728 (4 pages).
International Preliminary Report on Patentability mailed Jul. 28, 2022 for International Patent Application No. PCT/EP2021/051728 (5 pages in German; 6 Pages English translation).
Office Action mailed Jan. 14, 2025 for Japanese Pagent Application No. 2022-544383 (4 pages in Japanese; 4 pages English translation).

\* cited by examiner

DOUBLE-LAYER THREE-WAY CATALYST WITH FURTHER IMPROVED AGEING STABILITY

The present invention relates to a three-way catalyst which is composed of two catalytically-active layers arranged on top of each other and which is suitable for cleaning exhaust gases from combustion engines.

Three-way catalysts are used for cleaning exhaust gases from substantially stoichiometrically-operated combustion engines. In stoichiometric operation, the quantity of air fed to the engine corresponds exactly to the quantity required for complete combustion of the fuel. In this case, the air-fuel ratio $\lambda$, also known as the air ratio, is exactly 1. Three-way catalysts at around $\lambda=1$ are able to simultaneously convert hydrocarbons, carbon monoxide, and nitrogen oxides to harmless components.

In general, platinum group metals are used as catalytically-active materials, particularly platinum, palladium and rhodium, which are, for example, present on $\gamma$ aluminum oxide as support material. In addition, three-way catalysts contain oxygen storage materials, e.g., cerium/zirconium mixed oxides. In the latter case, cerium oxide, a rare earth metal oxide, constitutes the component that is fundamental to the oxygen storage. Along with zirconium oxide and cerium oxide, these materials may contain additional components, such as further rare earth metal oxides or alkaline earth metal oxides. Oxygen storage materials are activated by applying catalytically-active materials, such as platinum group metals, and therefore also serve as support material for the platinum group metals.

The components of a three-way catalyst may be present in a single coating layer on an inert catalyst support; see, for example, EP1541220B1.

However, double-layer catalysts are frequently used, which facilitate a separation of different catalytic processes and, therefore, enable an optimal coordination of the catalytic effects in the two layers. Catalysts of the latter type are disclosed, for example, in WO95/35152A1, WO2008/000449A2, EP0885650A2, EP1046423A2, EP1726359A1, and EP1974809B1.

EP1974809B1 discloses double-layer, three-way catalysts that contain cerium/zirconium mixed oxides in both layers, wherein the cerium/zirconium mixed oxide in the top layer respectively has a higher proportion of zirconium than that in the bottom layer.

EP1900416B1 describes double-layer, three-way catalysts that contain mixed oxides of cerium, zirconium, and neodymium in both layers and, additionally, cerium/zirconium/yttrium/lanthanum oxide-aluminum oxide particles in the bottom layer.

EP1726359A1 describes double-layer, three-way catalysts that contain cerium/zirconium/lanthanum/neodymium mixed oxides with a zirconium content of more than 80 mol % in both layers, wherein the cerium/zirconium/lanthanum/neodymium mixed oxide in the top layer may respectively have a higher proportion of zirconium than that in the bottom layer.

WO2008/000449A2 also discloses double-layer catalysts that contain cerium/zirconium mixed oxides in both layers, and wherein the mixed oxide in the top layer again has a higher proportion of zirconium. To some extent, the cerium/zirconium mixed oxides may also be replaced by cerium/zirconium/lanthanum/neodymium mixed oxides or cerium/zirconium/lanthanum/yttrium mixed oxides.

WO2009/012348A1 even describes three-layer catalysts wherein only the middle and the top layers contain oxygen storage materials.

EP3045226A1 discloses double-layer, three-way catalysts with improved aging stability, wherein a layer A lying directly on the catalyst support contains at least one platinum group metal, as well as one cerium/zirconium/RE metal mixed oxide, and a layer B, applied on layer A and in direct contact with the exhaust gas stream, contains at least one platinum group metal, as well as a cerium/zirconium/RE metal mixed oxide, wherein RE stands for a rare-earth metal except for cerium, characterized in that the proportion of RE metal oxide in the cerium/zirconium/RE metal mixed oxide of layer A is less than the proportion of RE metal oxide in the cerium/zirconium/RE metal mixed oxide of layer B.

The constantly increasing demand for a reduction in emissions from combustion engines requires the continuous further development of catalysts. In Europe, the durability requirements have been increased with the legislative stage Euro 5 to 160,000 km. The USA even has durability requirements of up to 150,000 miles.

Therefore, the aging stability of the catalysts has become even more important. The key criteria for the activity after aging are, on the one hand, the catalyst's start-up temperatures for the conversion of the pollutants and, on the other, its dynamic conversion capacity. The start-up temperature for a pollutant indicates the temperature from which this pollutant will be converted by more than, for example, 50%. The lower these temperatures are, the sooner the pollutants can be converted after a cold start. Under full load, exhaust gas temperatures of up to 1050° C. can occur directly at the motor output. The better the catalyst's temperature stability, the closer it can be arranged to the engine. This also improves exhaust gas cleaning after a cold start.

Since the Euro 6c stage took effect in September 2017, European emissions legislation has been stipulating exhaust gas measurements under real driving conditions (Real Driving Emissions RDE). Depending upon driving conditions, this can mean that the catalyst will have to meet much higher demands—particularly with respect to the dynamic conversion of carbon monoxide and nitrogen oxides.

The goal is to maintain a stoichiometric exhaust gas under all driving conditions, in particular even at high speed. The previously conventional enrichment of the fuel mixture for lowering the exhaust gas temperature is to be avoided, since it leads to high CO emissions and increases fuel consumption. By avoiding enrichment, however, the exhaust gas temperature, to which the catalyst is exposed at high speeds, continues to rise. These further increased demands must be handled by the catalyst. For this reason as well, the aging stability of three-way catalysts must be further increased.

The catalysts according to the aforementioned prior art already have very good properties with regard to start-up temperatures and dynamic conversion capacity after aging. However, the increased legal requirements make it necessary to search for even better catalysts.

For this reason, it was the object of this invention to provide a catalyst that, due to its further increased temperature stability, has even lower start-up temperatures and an improved dynamic conversion capacity after aging, compared to the catalysts of prior art.

Surprisingly, it was found that, with increased aging requirements, this problem can be solved if the rare-earth elements, and also, optionally, the platinum group metals present as components of the oxygen storage materials are distributed in a specific way on the two layers of a double-layer, three-way catalyst.

Therefore, the subject matter of the present invention is a catalyst comprising two layers on an inert catalyst support, wherein a layer A contains at least palladium as a platinum group metal, as well as a cerium/zirconium/lanthanum/yttrium mixed oxide, and a layer B applied to layer A contains at least rhodium as a platinum group metal, as well as a cerium/zirconium/lanthanum/yttrium mixed oxide. In both layers A and B, the lanthanum oxide content is between 1% by weight and 5% by weight, based on the cerium/zirconium/lanthanum/yttrium mixed oxide, and the yttrium oxide content is between 8% by weight and 20% by weight, based on the cerium/zirconium/lanthanum/yttrium mixed oxide.

A preferred embodiment is characterized in that the yttrium oxide content in both layers A and B is between 10% by weight and 15% by weight, based on the cerium/zirconium/lanthanum/yttrium mixed oxide. An yttrium oxide content between 12% by weight and 13% by weight is particularly preferred. As shown in the examples, despite intensive aging, a lower start-up temperature can thereby be achieved, which ultimately leads to fewer emissions during dynamic driving.

According to the invention, layer A contains at least palladium as a platinum group metal and layer B contains at least rhodium as a platinum group metal. In embodiments of the present invention, layer A and/or layer B, independently of one another, additionally contain platinum as a further platinum group metal. Layer A preferably contains palladium and platinum and layer B preferably contains rhodium and platinum or rhodium and palladium and platinum. In further embodiments of the present invention, the catalyst according to the invention is free of platinum. Particularly preferably, layer A contains only palladium and layer B only rhodium or layer B contains only palladium and rhodium.

Cerium/zirconium/lanthanum/yttrium mixed oxides may serve as support materials for the platinum group metals in layer A and/or in layer B. Furthermore, however, the platinum group metals in layer A and/or in layer B can also be supported wholly or in part on active aluminum oxide.

Therefore, in a preferred embodiment of the present invention, layer A and layer B contain active aluminum oxide. It is particularly preferable for the active aluminum oxide to be stabilized by means of doping, in particular with lanthanum oxide. Preferred active aluminum oxides contain 0.5 to 6% by weight, in particular 3 to 5% by weight, lanthanum oxide ($La_2O_3$).

The term "active aluminum oxide" is known to the person skilled in the art. It particularly describes γ aluminum oxide with a specific surface area of 100 $m^2/g$ to 200 $m^2/g$. Active aluminum oxide is frequently described in the literature and is commercially available.

The term "cerium/zirconium/lanthanum/yttrium mixed oxide" within the meaning of the present invention excludes physical mixtures of cerium oxide, zirconium oxide, lanthanum oxide and yttrium oxide. Rather, "cerium/zirconium/lanthanum/yttrium mixed oxides" are characterized by a largely homogeneous, three-dimensional crystal structure that is ideally free of phases of pure cerium oxide, zirconium oxide or lanthanum oxide and yttrium oxide. Depending on the manufacturing process, however, not completely homogeneous products may arise which can generally be used without any disadvantage.

According to the invention, the ratio of cerium oxide to zirconium oxide in the cerium/zirconium/lanthanum/yttrium mixed oxides may vary widely. In layer A, it is, for example, 0.1 to 1.0, preferably from 0.2 to 0.7, even more preferably from 0.3 to 0.5. In layer B, it is, for example, 0.1 to 1.0, preferably from 0.2 to 0.7, even more preferably from 0.3 to 0.5. The cerium/zirconium/lanthanum/yttrium mixed oxides of the present invention do not, in particular, contain aluminum oxide in their crystal structure.

In embodiments of the present invention, one layer or both layers contain alkaline earth metal compounds, such as barium oxide or barium sulfate. Preferred embodiments contain barium sulfate in layer A. The quantity of barium sulfate amounts, in particular, to 5 g/l to 20 g/l of the volume of the inert catalyst support.

In further embodiments of the present invention, one or both layers additionally contain additives, such as rare-earth compounds, such as lanthanum oxide, and/or binders, such as aluminum compounds. These additives are used in quantities that may vary within wide limits and that the person skilled in the art can determine by simple means in the specific case.

In a further embodiment of the present invention, layer A lies directly on the inert catalyst support, i.e., there is no additional layer or no undercoat between the inert catalyst support and layer A. In a further embodiment of the present invention, layer B is in direct contact with the exhaust gas stream, i.e., there is no additional layer or no overcoat on layer B.

In a further embodiment of the present invention, the catalyst according to the invention consists of layers A and B on an inert catalyst support. This means that layer A lies directly on the inert catalyst support, layer B is in direct contact with the exhaust gas stream, and no other layers are present.

Honeycomb bodies made from ceramic or metal with a volume V, which have parallel flow channels for the exhaust gases of the combustion engine, are particularly suitable as catalytically-inert catalyst supports. They may be either so-called flow-through honeycomb bodies or wall flow filters. In particular in the case of a wall flow filter, the catalytic coating according to the invention can be located completely on, partially in or completely in the wall of the wall flow filter.

According to the invention, the wall areas of the flow channels are coated with the two catalyst layers A and B. In order to coat the catalyst support with layer A, the solids provided for this layer are suspended in water and the catalyst support is coated optionally on and/or in the wall with the coating suspension that is thus obtained. The process is repeated with a coating suspension, in which the solids that are provided for layer B are suspended in water.

Preferably, both layer A and layer B are coated along the entire length of the inert catalyst support. This means that layer B completely covers layer A, and, as a result, only layer B comes into direct contact with the exhaust gas stream. However, a zoned coating variant is also possible in which, however, layer A is at least partially covered by layer B.

EXAMPLES

In the following example 1 and in comparative example 1, double-layer catalysts were produced by twice coating flow-through honeycomb bodies made from ceramic with 93 cells per $cm^2$ and with a wall thickness of 0.11 mm, as well as dimensions of 10.6 cm in diameter and 11.4 cm in length. To this end, two different suspensions were produced, respectively for layer A and B. The support was first coated with the suspension for layer A and then calcined in air for 4 hours at 550° C. Subsequently, the support coated with layer A was coated with the suspension for layer B and then calcined under the same conditions as for layer A.

Example 1

A double-layer catalyst was produced by first producing two suspensions. The composition of the first suspension for layer A (based on the volume of the catalyst support) was 66 g/L with 4% by weight of $La_2O_3$ stabilized activated aluminum oxide, 66 g/L of cerium/zirconium/lanthanum/yttrium mixed oxide with 24% by weight of $CeO_2$, 60% by weight of $ZrO_2$, 3.5% by weight of $La_2O_3$ and 12.5% by weight of $Y_2O_3$, 16 g/L $BaSO_4$, 1.413 g/L Pd.

The composition of the second suspension for layer B (based on the volume of the catalyst support) was 60 g/L with 4% by weight of $La_2O_3$ stabilized activated aluminum oxide, 47 g/L of cerium/zirconium/lanthanum/yttrium mixed oxide with 24% by weight of $CeO_2$, 60% by weight of $ZrO_2$, 3.5% by weight of $La_2O_3$ and 12.5% by weight of $Y_2O_3$, 0.177 g/L Rh.

Comparative Example 1 (According to EP3045226A1)

A double-layer catalyst was produced analogously to example 1. The composition of the first suspension for layer A was 66 g/L with 4% by weight of $La_2O_3$ stabilized activated aluminum oxide, 66 g/L of cerium/zirconium/lanthanum/yttrium mixed oxide with 25% by weight of $CeO_2$, 67.5% by weight of $ZrO_2$, 3.5% by weight of $La_2O_3$ and 4% by weight of $Y_2O_3$, 16 g/L $BaSO_4$, 1.143 g/L Pd.

The composition of the second suspension for layer B was 60 g/L with 4% by weight of $La_2O_3$ stabilized activated aluminum oxide, 47 g/L of cerium/zirconium/lanthanum/yttrium mixed oxide with 24% by weight of $CeO_2$, 60% by weight of $ZrO_2$, 3.5% by weight of $La_2O_3$ and 12.5% by weight of $Y_2O_3$, 0.177 g/L Rh.

Example 1 and comparative example 1 were aged in an engine test bench aging process. In each case, two similar catalysts were exposed to the hot exhaust gas one after the other. The aging process consisted of an overrun cut-off aging process with an exhaust gas temperature of 950° C. before the catalyst input. This resulted in a maximum bed temperature of 1100° C. in the first catalyst (CC1) and a maximum bed temperature of 1040° C. in the second catalyst (CC2). The aging time was 100 hours.

Subsequently, an engine test bench was used to test the start-up performance at a constant average air ratio $\lambda$, and the dynamic conversion with a change in $\lambda$.

Table 1 contains the temperatures $T_{50}$ at which in each case 50% of the component in question are converted. Here, the start-up performance with a stoichiometric exhaust gas composition ($\lambda$=0.999 with ±3.4% amplitude) was determined.

|  | $T_{50}$ HC stoichiometric | $T_{50}$ CO stoichiometric | $T_{50}$ NOx stoichiometric |
| --- | --- | --- | --- |
| Comparative example 1 CC1 | 476 | >500° C. | >500° C. |
| Example 1 CC1 | 428 | 464 | 452 |
| Comparative example 1 CC2 | 404 | 410 | 412 |
| Example 1 CC2 | 364 | 362 | 363 |

The dynamic conversion performance was determined in a range for $\lambda$ of 0.99 to 1.01 at a constant temperature of 510° C. The amplitude of $\lambda$ in this case was ±3.4%. Table 2 contains the conversion at the point of intersection of the CO and NOx conversion curves, as well as the associated HC conversion.

|  | CO/NOx conversion at the point of intersection | HC conversion at $\lambda$ of the CO/NOx point of intersection |
| --- | --- | --- |
| Comparative example 1 CC1 | 46% | 81% |
| Example 1 CC1 | 60% | 86% |
| Comparative example 1 CC2 | 74.5% | 91 |
| Example 1 CC2 | 93% | 94.5 |

Example 1 according to the invention shows a significant improvement in the start-up performance and in the dynamic CO/NOx conversion after aging.

The invention claimed is:
1. Catalyst comprising two layers arranged on top of each other on an inert catalyst support, wherein
  a layer A contains at least palladium as a platinum group metal and a cerium/zirconium/lanthanum/yttrium mixed oxide, and
  a layer B applied to layer A contains at least rhodium as a platinum group metal, and a cerium/zirconium/lanthanum/yttrium mixed oxide,
  wherein, in both layers A and B, the lanthanum oxide content is between 1% by weight and 5% by weight, based on the cerium/zirconium/lanthanum/yttrium mixed oxide, and the yttrium oxide content is between 10% by weight and 20% by weight, based on the cerium/zirconium/lanthanum/yttrium mixed oxide.
2. Catalyst according to claim 1, wherein layer A and/or layer B, independently of one another, additionally contain platinum as a further platinum group metal.
3. Catalyst according to claim 1, wherein layer A contains only palladium and layer B only rhodium or layer B only palladium and rhodium as platinum group metal.
4. Catalyst according to claim 1, wherein that layer A and layer B contain active aluminum oxide.
5. Catalyst according to claim 4, wherein the platinum group metal in layer A and/or in layer B is supported wholly or in part on active aluminum oxide.
6. Catalyst according to claim 1, wherein the weight ratio of cerium oxide to zirconium oxide in the cerium/zirconium/lanthanum/yttrium mixed oxide in layer A and layer B is 0.1 to 1.0.
7. Catalyst according to claim 1, wherein layer A lies directly on the inert catalyst support.
8. Catalyst according to claim 1, wherein in both layers A and B, the lanthanum oxide content is between 1% by weight and 3.5% by weight, based on the cerium/zirconium/lanthanum/yttrium mixed oxide, and the yttrium oxide content is between 12% by weight and 20% by weight, based on the cerium/zirconium/lanthanum/yttrium mixed oxide.
9. Catalyst according to claim 1, wherein in both layers A and B, the yttrium oxide content is between 12% by weight and 20% by weight, based on the cerium/zirconium/lanthanum/yttrium mixed oxide.
10. Catalyst according to claim 9, wherein in both layers A and B, the yttrium oxide content is between 12% by weight and 15% by weight, based on the cerium/zirconium/lanthanum/yttrium mixed oxide.

11. Catalyst according to claim 10, wherein in both layers A and B, the yttrium oxide content is between 12% by weight and 13% by weight, based on the cerium/zirconium/lanthanum/yttrium mixed oxide.

* * * * *